United States Patent
Ruddy

(10) Patent No.: US 6,792,435 B1
(45) Date of Patent: Sep. 14, 2004

(54) METHOD AND APPARATUS FOR RECOVERING THE DEFINITIONS OF DROPPED DATABASE OBJECTS

(75) Inventor: James A. Ruddy, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 1068 days.

(21) Appl. No.: 09/037,879

(22) Filed: Mar. 10, 1998

(51) Int. Cl.[7] .............................................. G06F 12/00
(52) U.S. Cl. ...................................... 707/202; 707/102
(58) Field of Search ................................ 707/202, 204, 707/8, 201, 102, 206, 205; 364/282, 222; 714/16

(56) References Cited

U.S. PATENT DOCUMENTS

| | | | | |
|---|---|---|---|---|
| 4,945,474 A | * | 7/1990 | Elliott et al. .................... | 714/16 |
| 5,455,946 A | * | 10/1995 | Mohan et al. ............... | 707/202 |
| 5,758,355 A | * | 5/1998 | Buchanan .................... | 707/201 |
| 5,832,508 A | * | 11/1998 | Sherman et al. ............. | 707/202 |
| 5,884,327 A | * | 3/1999 | Cotner et al. ................ | 707/202 |
| 5,890,165 A | * | 3/1999 | Boudrie et al. .............. | 707/202 |

* cited by examiner

*Primary Examiner*—Wayne Amsbury
*Assistant Examiner*—Thu-Thao Havan
(74) *Attorney, Agent, or Firm*—Sughrue Mion, PLLC

(57) ABSTRACT

A database management system maintains a system catalog for storing information regarding the data definitions of the managed data objects, where all information necessary for the recreation of the data definitions must be available or inferable from the stored information. The inventive database management system also maintains log records or a journal of changes which occur within the database system, especially to the system catalog information. When a drop of a managed data object occurs, the deletion of the system catalog data definition information is recorded in the log. To recreate the data definitions of the dropped objects, first the information about the dropped objects, deleted from the system catalog, is located in the log records. Second, the log records are read and extracted. Third, the definition information is extracted or inferred from the log records. Finally, the definition information is translated into the appropriate definition instructions for the database management system, for example, in SQL.

31 Claims, 4 Drawing Sheets

```
CREATE     DATABASE DB1
COL   LASTNAME CHAR(50)
.
.
.
TABLE TBL1 TSP1 DB1
TABLESPACE TSP1 DB1
DATABASE DB1
.
.
DROP TABLE TBL1 TSP1 DB1
DROP TABLESPACE TSP1 DB1
DROP DATABASE DB1
.
.
.
.
.
.
```

FIGURE 1

```
CREATE    DATABASE DB1
CREATE    TABLESPACE TSP1
          IN DATABASE DB1
CREATE    TABLE TBL1
          LASTNAME CHAR(50)
          FIRSTNAME CHAR(20)
          MI CHAR(1)
          BIRTHDATE DATE
          IN DB1 TSP1
```

FIGURE 2

```
DROP     TABLE TB1
DROP     TABLESPACE DB1 TSP1
DROP     DATABASE DB1
```

FIGURE 3

```
CREATE    DATABASE DB1
COL  LASTNAME CHAR(50)
.
.
.
TABLE TBL1 TSP1 DB1
TABLESPACE TSP1 DB1
DATABASE DB1
.
.
DROP TABLE TBL1 TSP1 DB1
DROP TABLESPACE TSP1 DB1
DROP DATABASE DB1
.
.
.
.
.
.
```

METHOD AND APPARATUS FOR RECOVERING THE DEFINITIONS OF DROPPED DATABASE OBJECTS

BACKGROUND OF THE INVENTION

1. Field of the Invention

The present invention relates generally to the field of databases and particularly to the recovery of data definitions of dropped database objects.

2. Description of the Related Art

Databases have commonly been used to store vast amounts of related information. DB2 is an application program provided by IBM to create and manage databases. Both DB2 and IBM are registered trademarks of the International Business Machines Corporation.

Databases, such as DB2, provide the capability to store and manipulate large amounts of data in a database. The data in the database is stored in tables, where each table contains both rows and columns for entries of the data. Further, information regarding data definitions of the tables, which is used to create the tables, is stored in a system catalog, which is made up of at least one table.

In order to keep the database running smoothly, it is important to have good backup and recovery mechanisms. Occasionally, in such a large database as is managed by DB2, for example, the data definitions of the database management system are inadvertently dropped from the database system, when the objects defined by the data definitions, e.g. tables, are dropped from the database system. In other words, the data definitions are deleted. Alternatively, the data definitions may be inaccessible due to corruption of a storage medium upon which the data definitions and relation information are stored. Before data may be restored from any backup copies of the database, the data definitions must be restored.

However, in prior systems, once a command causing the drop of the data definitions has been committed to in the database system, for example, there is no way to reverse the drop and restore the data. In such prior systems, the only way to restore the data was to completely rewrite the data definitions from scratch using a data definition language and then restore the actual data. However, if the administrator of the database management system has not been diligent and has not kept all of the data definitions and subsequent modifications, the rewriting of the data definitions from scratch and the subsequent restoration of the data is problematic.

SUMMARY OF THE INVENTION

These and other difficulties are overcome by the present invention, which has as an object, the provision of a method and apparatus for and an article of manufacture embodying the recovery of the data definitions using log records.

The log records of a database system maintain a record of all additions and deletions of information regarding data definitions from the system catalog of the database management system. In accordance with the present invention, log records relating to the information regarding data definitions which are deleted or otherwise inaccessible from the system catalog are first located. Next, the located log records are extracted or read. Then the data definition information is extracted from the read log records. Finally, the extracted information is translated into the appropriate data definition instructions for the database management system so that the data definitions may be restored.

BRIEF DESCRIPTION OF THE DRAWINGS

The above objects and advantages of the present invention will become more apparent by describing in detail preferred embodiments thereof with reference to the attached drawings in which:

FIG. 1 shows a listing in which a data table is created using a data definition language.

FIG. 2 shows a listing of commands dropping data definitions.

FIG. 3 shows an example of log records.

DETAILED DESCRIPTION OF THE INVENTION

Figure 4:
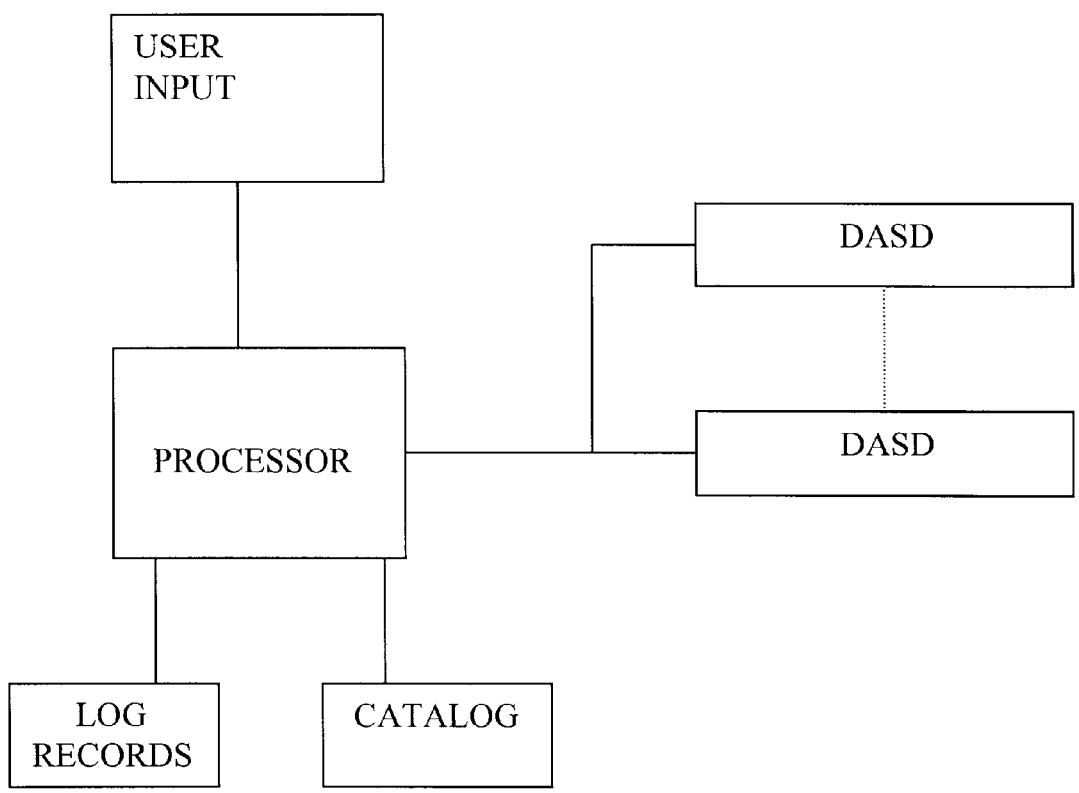
FIG. 4 shows a system upon which the present invention may be implemented.

A preferred embodiment of a method and apparatus for recovering the data definitions of dropped database objects, according to the present invention is described below in detail with reference to the accompanying drawings. It is to be noted that while the following discussion is presented in the context of the DB2 application program, the present invention is not so limited.

A relational database, such as one created and managed by DB2, contains data entries organized in a plurality of tables. The physical places where the tables are stored within the database are called table spaces. Thus the database is essentially a collection of table spaces. Alternatively, the tables may be stored directly in the database, without the need for table spaces. Regardless, each table has columns, where each column in each table has an identification associated with it and contains certain types of information. Each table also has rows for different instances of the types of information. Relationships between the tables may be specified in multiple ways through the use of a query language, such as a structure query language (SQL), which is a type of data definition language. Thus, physical links between the tables are not necessary. There are different versions of SQL, the present invention not being limited to any one particular version. The data definition language is also used to create the database, in the first instance.

Looking at a specific example, the database might be used to store employee information for a company. FIG. 1 shows a portion of a program listing in data definition language, which might be used to create the employee database. Essentially, FIG. 1 shows the data definition language written by a user of the database management system to create the database. In creating the database, first, the database DB1 is created with table space TSP1. Then, a table TBL1 is created in table space TSP1 with columns for different types of information. For example, one column might be called LASTNAME, where 50 characters are reserved for this column. Additional columns might include FIRSTNAME, middle initial MI, BIRTH DATE, etc. to provide a complete set of information on the employees. These, then are the columns that make up the table TBL1 in DB1 TSP1. The table has now been defined. This process may be repeated for other tables containing other types of information to be stored in the database.

When the listing shown in FIG. 1 is executed, the data definition language is processed and stored in an internal format which is easily understood and allows the user to issue queries against it. The resulting output of the execution is called meta data. Meta data is essentially information about the data definitions and structure of the data in the tables of a database. This meta data from the data definition language is captured and stored in a system catalog of the database, which comprises at least one table. Within the database, a table, such as TB1, may be spread out across multiple data sets. The system catalog also captures all the information regarding this spread from the data definition language.

If, subsequent to the creation of the database, the initial specification of the database in the data definition language, shown in FIG. 1 is lost, so long as the meta data remains in the system catalog, the administrator of the database management system can run queries against the system catalog tables and regenerate the definition language. Because all the information necessary to recreate the initial specification in the data definition language is stored in the system catalog, the information simply needs to be extracted and key words added so that the definitions may be regenerated. Regeneration can be done manually by executing queries. Alternatively, one of a number of tools can be used to run the queries automatically. This process of regeneration is well known to those in the field.

The problem addressed by the present invention arises when the meta data in the system catalog is lost, destroyed or inaccessible. In such a circumstance, the regeneration process is unavailable. For example, there are instructions, known as DROP instructions, which can be used to eliminate the information regarding data definitions from the system catalog. Examples of DROP instructions are shown in FIG. 2, which shows the elimination of table TB1, table space TSP1 and database DB1 using DROP instructions. In particular, the DROP TB1 instruction results in the deletion of the rows of information in the table TB1. The DROP instruction might be used to eliminate data which is no longer being used in the system or might be used when it is desired to reconfigure the data. However, problems occur when a DROP is inadvertently executed. The problem arises from the fact that the execution of the DROP instruction does not merely eliminate the data itself. The execution of a DROP instruction also results in the deletion of the corresponding meta data in the system catalog. Thus, the above procedure of regenerating the data definitions from the information stored in the system catalog is not available once a DROP instruction has been committed in the database system. An instruction is committed in a database system when, subsequent to the execution of the instruction, either a system or user generated commit command is executed.

The present invention also addresses the situation where the information stored in the system catalog is inaccessible because the storage medium upon which the system catalog is stored is corrupted, or when the information in the system catalog is otherwise inaccessible.

Thus, an important feature of the present invention is the log records of the database system. As each DROP instruction is executed, information regarding the DROP is tracked and stored in the log records. Information is also stored in the log records during creation of the database objects, for example, as discussed in connection with FIG. 1. So at creation, not only was data put into the physical tables of the database, but also information regarding what was being created was stored in the log records. More specifically, during creation of the table, information regarding the name of the table and where it will physically reside in the system is stored. Information is also stored about each of the columns that make up the table, e.g. the names of the columns, the data type that they store, the maximum length that they are allowed to store. One reason for keeping the log records is that during creation of a database object, such as a table, something can go wrong. In such a situation, it would be undesirable to leave the tables in an unstable state. The information stored in the log records may be used to reverse the sequence of steps followed so as to undo the previous operations performed while creating, even if, for example, something is deleted or missing from the system catalog.

Similarly, when a DROP instruction is executed, information is stored in the log record about properties of the dropped object and its constituents. For example, if a table space is dropped, information regarding the table space, the table and the columns of the table is stored in the log. It is to be noted that if a database is inadvertently dropped, there is a cascade effect. More specifically, if a database is dropped, that means that all the table spaces in the database are dropped, which, in turn, means that all the tables within all the table spaces within the database are dropped, and so on. This all occurs due to the relational nature of the database.

Thus, in accordance with the present invention, the log records store information regarding all actions taken in the database system, including adding, creating and dropping. An example of a log record is shown in FIG. 3, which sequentially lists actions taken in the database system.

The present invention allows this information stored in the log records to be used in a manner not done before. In accordance with the present invention, the information in the log may be queried to regenerate the data definition language to restore the data definitions, and subsequently, recreate the dropped or inaccessible data object.

More specifically, in accordance with the present invention, when a user inadvertently drops an object, e.g. the database, the table space, tables, or any of the other objects that may be defined, thereby resulting in the deletion of the meta data in the system catalog, or when the information in the system catalog is otherwise inaccessible, an "UNDROP" or recovery procedure may be performed. In accordance with this procedure, first, the log records are accessed and read back through time until the information related to the drop instruction of a dropped object or the create instruction of an inaccessible object is found. The information found in the log records is then inserted into a template for the data definition language to regenerate the data definitions of appropriate object or set of objects. For example, there are separate templates for creating a database, creating a table, creating a column, etc. An example of a template for a data definition language statement for creating a database would be as follows.

CREATE DATABASE [dbname]

Through this step, the data definition language may be regenerated and executed. Then, once the data definitions have been restored, the data itself may be restored from backup copies of the database.

The present invention is to be distinguished from something known as a roll-back instruction. For example, in the situation where the user is in the process of executing a DROP instruction, if at the end of the drop the user decides that he/she did not want to execute the drop, he/she can execute a roll-back instruction during a window of time known as a "commit scope" or "unit or work". The commit scope or unit of work is the time during which an instruction is being executed, but prior to the execution of the commit command, discussed above. So as the data object is being deleted and the log records are being written, if a roll-back instruction is issued, the information in the log record can be reprocessed in real time, on the fly so to speak, to restore the data.

The present invention differs from a roll-back instruction in several respects. A first distinction is that the inventive procedure does not simply restore the data, as does a roll-back instruction. Instead, the inventive procedure regenerates the lost data definitions from the log records in the data definition language so that the database itself may be recreated. A second distinction results from the fact that the roll-back instruction may only be executed during the commit scope or unit of work window. For example, once a DROP is committed in the database system, by the execution of the commit command, the act is irreversible and the roll-back instruction is ineffective. In contrast, the present invention provides a new way to restore the data definitions of a dropped object after the DROP instruction has been committed.

FIG. 4 shows a physical implementation of a system upon which the present invention may be practiced. Such a system includes a processor (e.g. on a workstation, file server, mainframe, etc.) for running the database management system application program. The processor receives input from a user via an input device, such as a keyboard, for inputting a program listing in a data definition language, such as SQL. The processor is also connected to direct access storage devices (DASD). Examples of DASD include, among others, disk drives and tape drives. The DASD stores the various tables of the database. Finally, the processor is also connected to the system catalogs and the log records. The system catalogs and the log records may be stored on the DASD or may be stored in separate memory devices, such as tape.

In summary, the present invention is directed to a database management system, which maintains a system catalog for storing information regarding the data definitions of the managed data, where all information necessary for the recreation of the definitions must be available or inferable from the stored information. The database management system of the present invention also maintains a log or journal of changes which occur within the database system, especially to the system catalog information. When a drop of a managed data object occurs, or when information in the system catalog is inaccessible, information regarding the deletion of the system catalog information is recorded in the log along with information regarding the creation of the information in the first instance. To recreate the data definitions of the dropped or inaccessible objects, first the information about the dropped objects, deleted from the system catalog, or about inaccessible objects is located in the log records. Second the log records are read and extracted. Third, the definition information is extracted or inferred from the log records. Finally, the definition information is translated into the appropriate definition instructions for the database management system, for example, in SQL. The definition instructions may then be executed to recreate the objects.

Other modifications and variations to the invention will be apparent to those skilled in the art from the foregoing disclosure and teachings. For example, so long as the database in question retains the necessary information after a DROP instruction, or its equivalent, is performed, the appropriate data definition instructions can be recreated and the database restored. The applicability of the invention is not limited to the manner in which DB2 retains information in system catalogs or log records, or to the manner in which a DROP instruction is executed. Thus, while only certain embodiments of the invention have been specifically described herein, it will be apparent that numerous modifications may be made thereto without departing from the spirit and scope of the invention.

What is claimed is:

1. A computer system for recreating data definitions in a database system, the computer system comprising:
   log records for storing information, including information regarding changes in the database system; and
   a processor for extracting data definition information from the information stored in the log records and translating the data definition information into data definition instructions for the database system.

2. The computer system according to claim 1, further comprising a system catalog for storing information regarding the data definitions defining objects of the database system, wherein the log records store information stored in the system catalog and information regarding changes in the system catalog.

3. The computer system according to claim 1, wherein the processor further executes the data definition instructions, thereby recreating data objects specified by the data definitions.

4. The computer system according to claim 2, wherein the processor executes the extracting and translating steps after the changes in the system catalog have been committed in the database system.

5. The computer system according to claim 4, wherein at least one of the changes is a drop, from the system catalog, of the information regarding the data definitions.

6. The computer system according to claim 2, wherein the processor executes the extracting and translating steps when the information in the system catalog is inaccessible.

7. The computer system according to claim 1, wherein the processor translates the data definition information by inserting the extracted data definition information into templates of data definition instructions.

8. The computer system according to claim 1, wherein the data definition instructions are in structure query language (SQL).

9. A computer-readable medium of instructions for recreating data definitions in a database system, the computer-readable medium of instructions comprising:
   log records for storing information, including information regarding changes in the database system; and
   an application program for extracting the data definition information from the information stored in the log records and translating the data definition information into data definition instructions for the database system.

10. The computer-readable medium of instructions according to claim 9, further comprising a system catalog for storing information regarding the data definitions defining objects of the database system, wherein the log records store information stored in the system catalog and information regarding changes in the system catalog.

11. The computer-readable medium of instructions according to claim 9, wherein the application program executes the data definition instructions, thereby recreating data objects specified by the data definitions.

12. The computer-readable medium of instructions according to claim 10, wherein the application program executes the extracting and translating steps after the changes in the system catalog have been committed in the database system.

13. The computer-readable medium of instructions according to claim 12, wherein at least one of the changes is a drop, from the system catalog, of the information regarding the data definitions.

14. The computer-readable medium of instructions according to claim 10, wherein the application program executes the extracting and translating steps when the information stored in the system catalog is inaccessible.

15. The computer-readable medium of instructions according to claim 9, wherein the application program translates the data definition information by inserting the extracted data definition information into templates of data definition instructions.

16. The computer-readable medium of instructions according to claim 9, wherein the data definition instructions are in structure query language (SQL).

17. A computer program to be performed on or with the aid of a computer system, for recreating data definitions in a database system including log records for storing information, including information regarding changes in the database system, the computer program comprising the steps of:
  extracting data definition information from the information stored in the log records; and
  translating the data definition information into data definition instructions for the system.

18. The computer program according to claim 17, wherein the database system further includes a system catalog for storing information regarding the data definitions defining objects of a database system, wherein the log records store information stored in the system catalog and information regarding changes in the system catalog.

19. The computer program according to claim 17, further comprising the step of:
  executing the data definition instructions, thereby recreating data objects specified by the data definitions.

20. The computer program according to claim 18, wherein said steps of extracting and translating take place after the changes in the system catalog have been committed in the database system.

21. The computer program according to claim 20, wherein at least one of the changes is a drop, from the system catalog, of the information regarding the data definitions.

22. The computer program according to claim 18, wherein the steps of extracting and translating take place when the information stored in the system catalog is inaccessible.

23. The computer program according to claim 17, wherein the step of translating comprises inserting the extracted data definition information into templates of data definition instructions.

24. The computer program according to claim 17, wherein the data definition instructions are in system query language (SQL).

25. A method for recreating data definitions in a database system including log records for storing information, including information regarding changes in the database system, the method comprising the steps of:
  extracting data definition information from the information stored in the log records;
  translating the data definition information into data definition instructions for the system; and
  executing the data definition instructions, thereby recreating data objects specified by the data definitions.

26. The method according to claim 25, wherein the database system further includes a system catalog for storing information regarding the data definitions defining objects of the database system, wherein the log records store information stored in the system catalog and information regarding changes in the system catalog.

27. The method according to claim 26, wherein said steps of extracting and translating take place after the changes in the system catalog have been committed in the database system.

28. The method according to claim 27, wherein at least one of the changes is a drop, from the system catalog, of the information regarding the data definitions.

29. The method according to claim 26, wherein the steps of extracting and translating take place when the information stored in the system catalog is inaccessible.

30. The method according to claim 25, wherein the step of translating comprises inserting the extracted data definition information into templates of data definition instructions.

31. The method according to claim 25, wherein the data definition instructions are written in structured query language (SQL).

* * * * *